US012280819B2

(12) United States Patent
Kim

(10) Patent No.: US 12,280,819 B2
(45) Date of Patent: Apr. 22, 2025

(54) STEERING DEVICE OF VEHICLE

(71) Applicant: HL MANDO CORPORATION, Pyeongtaek (KR)

(72) Inventor: Jeongrae Kim, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 18/488,049

(22) Filed: Oct. 17, 2023

(65) Prior Publication Data
US 2024/0326895 A1 Oct. 3, 2024

(30) Foreign Application Priority Data
Mar. 30, 2023 (KR) .................. 10-2023-0041688

(51) Int. Cl.
*B62D 1/183* (2006.01)
*B62D 1/06* (2006.01)
*B62D 1/08* (2006.01)
*B62D 1/10* (2006.01)

(52) U.S. Cl.
CPC ............... *B62D 1/183* (2013.01); *B62D 1/06* (2013.01); *B62D 1/08* (2013.01); *B62D 1/10* (2013.01)

(58) Field of Classification Search
CPC ... B62D 1/06; B62D 1/08; B62D 1/10; B62D 1/183
See application file for complete search history.

(56) References Cited

U.S. PATENT DOCUMENTS

| | | | | |
|---|---|---|---|---|
| 10,800,441 B2* | 10/2020 | Board | ...................... | B62D 1/11 |
| 10,906,575 B2* | 2/2021 | Riedel | ...................... | B62D 1/04 |
| 11,325,635 B2* | 5/2022 | Ko | ...................... | B62D 1/04 |
| 11,952,033 B2* | 4/2024 | Kim | ...................... | B62D 1/06 |
| 2019/0071113 A1* | 3/2019 | Board | ...................... | B62D 1/14 |

* cited by examiner

*Primary Examiner* — Faye M Fleming
(74) *Attorney, Agent, or Firm* — Harvest IP Law, LLP

(57) ABSTRACT

According to the present embodiments, it is possible to separate the steering wheel from the driver's seat with a simple structure, thereby enhancing structural stability and rigidity, reducing the number of parts for changing the steering wheel structure, and minimizing the volume and mass of the steering device.

18 Claims, 6 Drawing Sheets

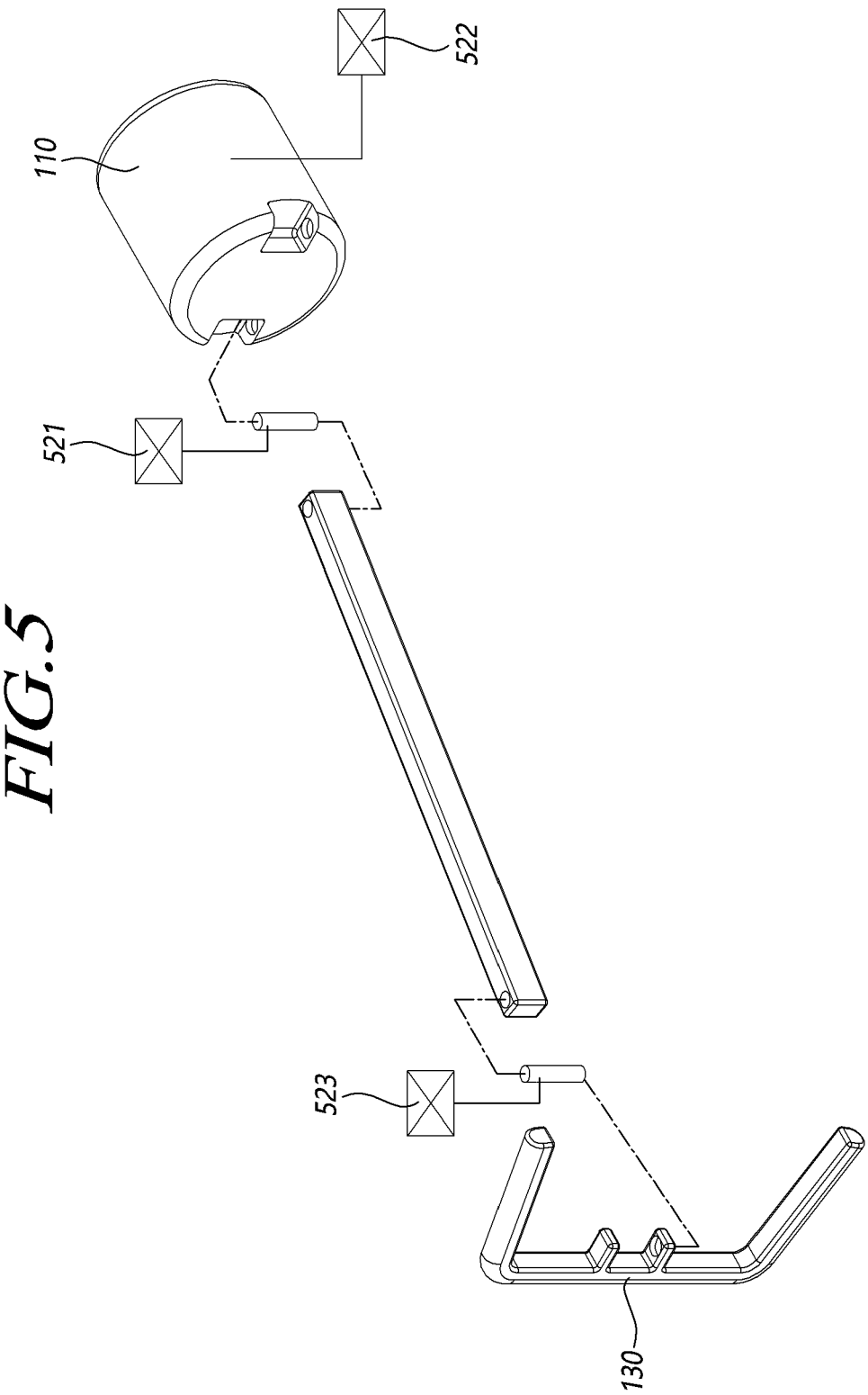

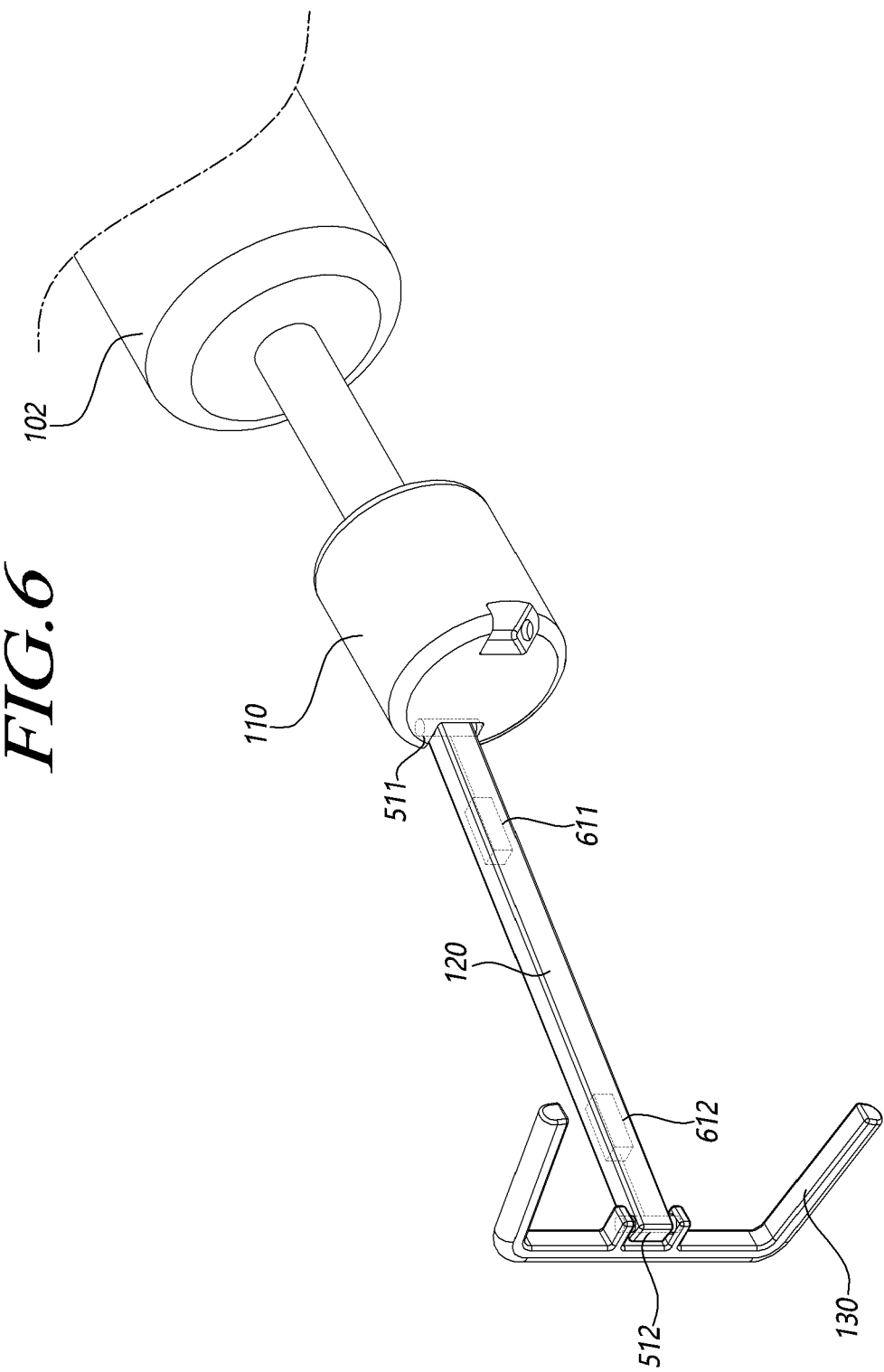

STEERING DEVICE OF VEHICLE

CROSS-REFERENCE TO RELATED APPLICATION

This application claims priority from Korean Patent Application No. 10-2023-0041688, filed on Mar. 30, 2023, which is hereby incorporated by reference for all purposes as if fully set forth herein.

BACKGROUND

Field

The present embodiments relate to a steering device of a vehicle, and more particularly, to a steering device of a vehicle capable of separating the steering wheel from the driver's seat with a simple structure, thereby enhancing structural stability and rigidity, reducing the number of parts for changing the steering wheel structure, and minimizing the volume and mass of the steering device.

Description of Related Art

A vehicle steering device is a device for changing the traveling direction of the vehicle as intended by the user and turns the left and right wheels of the vehicle to the left or right to allow the vehicle to travel in the direction desired by the driver.

The steering device includes a steering column for receiving the steering shaft connected with the steering wheel. Typically, the steering column has the telescoping and tilting functionality for adjusting the position of the steering wheel to fit the driver's height and body shape.

Recently, autonomous vehicles are advancing rapidly. Autonomous vehicles provide various features for enabling the driver to do various activities in autonomous driving mode. However, since the steering wheel occupies a large space in the driver's seat and interferes with the driver's activity, a structure for switching the position or structure so that the steering wheel does not occupy the driver's seat space in the autonomous driving mode has been developed.

For example, a steering column is being developed that allows the steering wheel to be stored in the vehicle body in the autonomous driving mode and the steering wheel to be withdrawn from the vehicle body in the manual mode, and most of these storage structures adopt a structure that increases the axial moving distance of the steering wheel. However, as the moving distance of the steering wheel increases, structural stability decreases, rigidity decreases, and volume and mass increase.

Supplementary measures are being developed to prevent problems caused by low rigidity, large volume, and mass of the steering wheel storage structure, but they are not a fundamental solution, and a new structure is needed to preserve the driver's seat space from the steering wheel.

BRIEF SUMMARY

As devised in the foregoing background, the present embodiments relate to a steering device of a vehicle capable of separating the steering wheel from the driver's seat with a simple structure, thereby enhancing structural stability and rigidity, reducing the number of parts for changing the steering wheel structure, and minimizing the volume and mass of the steering device.

According to the present embodiments, there may be provided a steering device of a vehicle, comprising a base part coupled to a vehicle body, a pair of spoke parts each having one end coupled to be rotatable with respect to the base part to operate in an operating state where another end thereof is positioned adjacent or in an expanded state where the other end is spaced apart, and a pair of rim parts respectively coupled to the other ends of the spoke parts.

According to the present embodiments, there may be provided a steering device of a vehicle, comprising a base part coupled to a vehicle body, at least one spoke part having one end coupled to be rotatable with respect to the base part via a first rotary shaft and rotated by a first driver, and at least one rim part coupled to another end of each spoke part.

According to the present embodiments, it is possible to separate the steering wheel from the driver's seat with a simple structure, thereby enhancing structural stability and rigidity, reducing the number of parts for changing the steering wheel structure, and minimizing the volume and mass of the steering device.

DESCRIPTION OF DRAWINGS

The above and other objects, features, and advantages of the disclosure will be more clearly understood from the following detailed description, taken in conjunction with the accompanying drawings, in which:

FIG. 5 is an exploded perspective view illustrating a portion of a steering device of a vehicle according to the present embodiments; and FIG. 6 is a perspective view illustrating a portion of a steering device of a vehicle according to the present embodiments.

DETAILED DESCRIPTION

Figure 1:
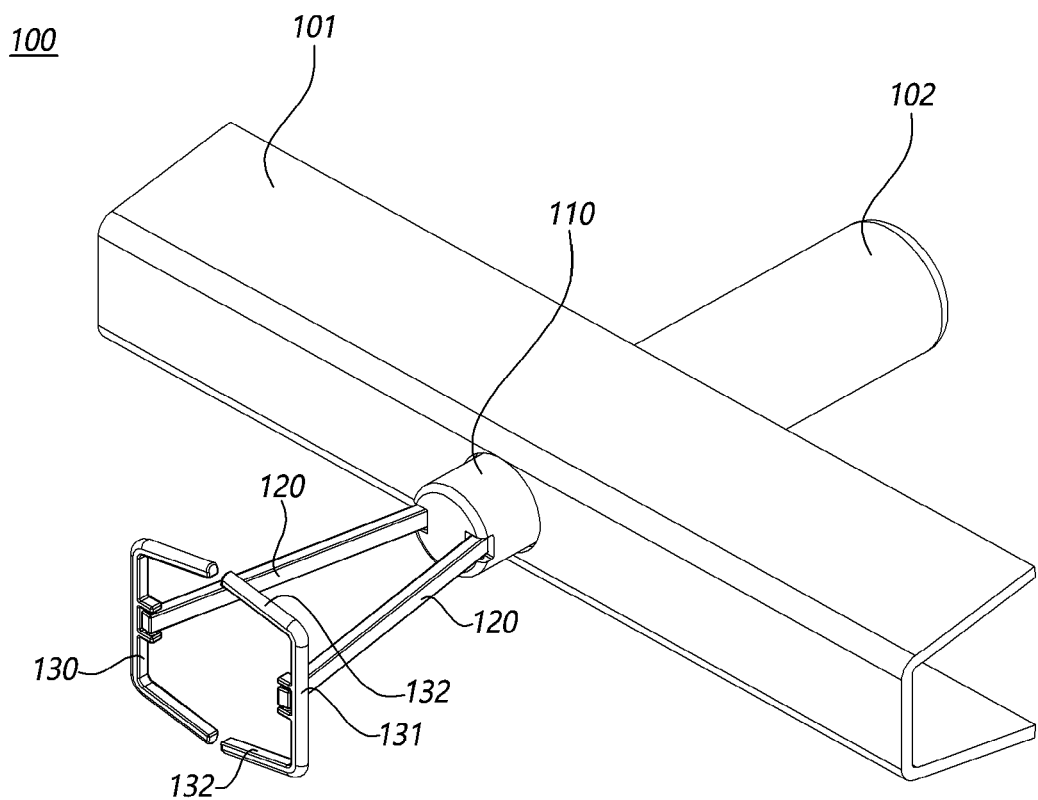
FIG. 1 is a perspective view illustrating a steering device of a vehicle according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
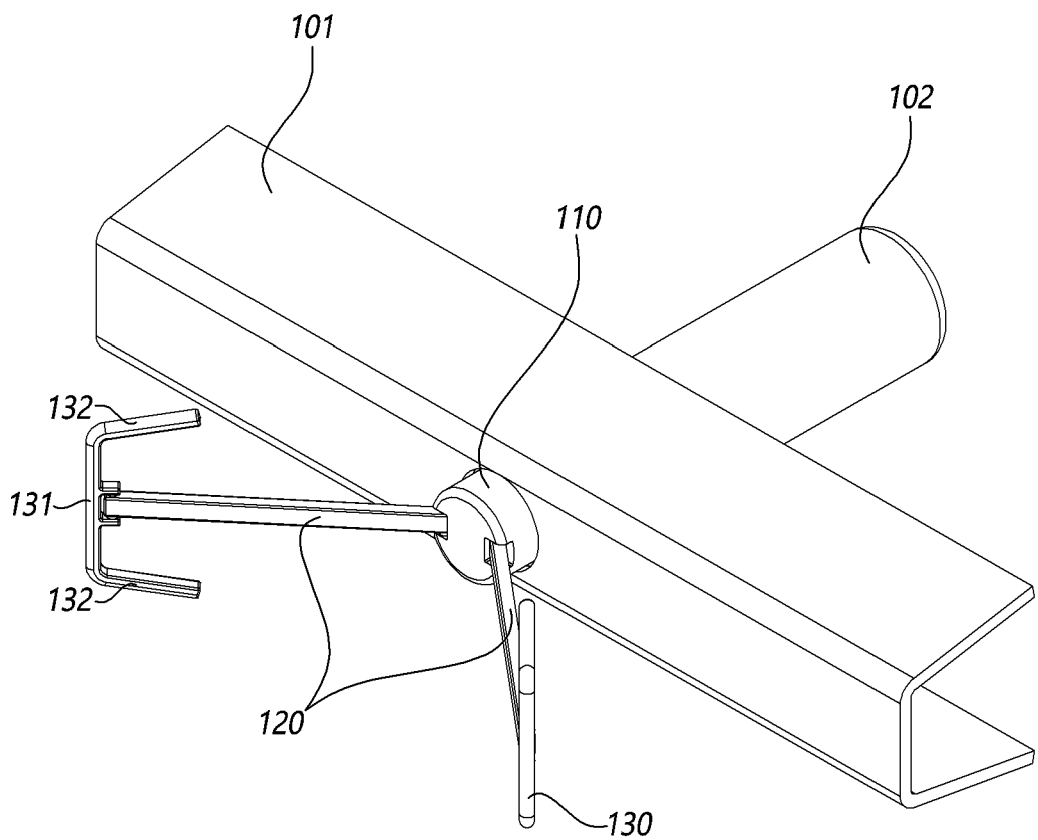
FIG. 2 is a perspective view illustrating a steering device of a vehicle according to the present embodiments.
Figure 3:
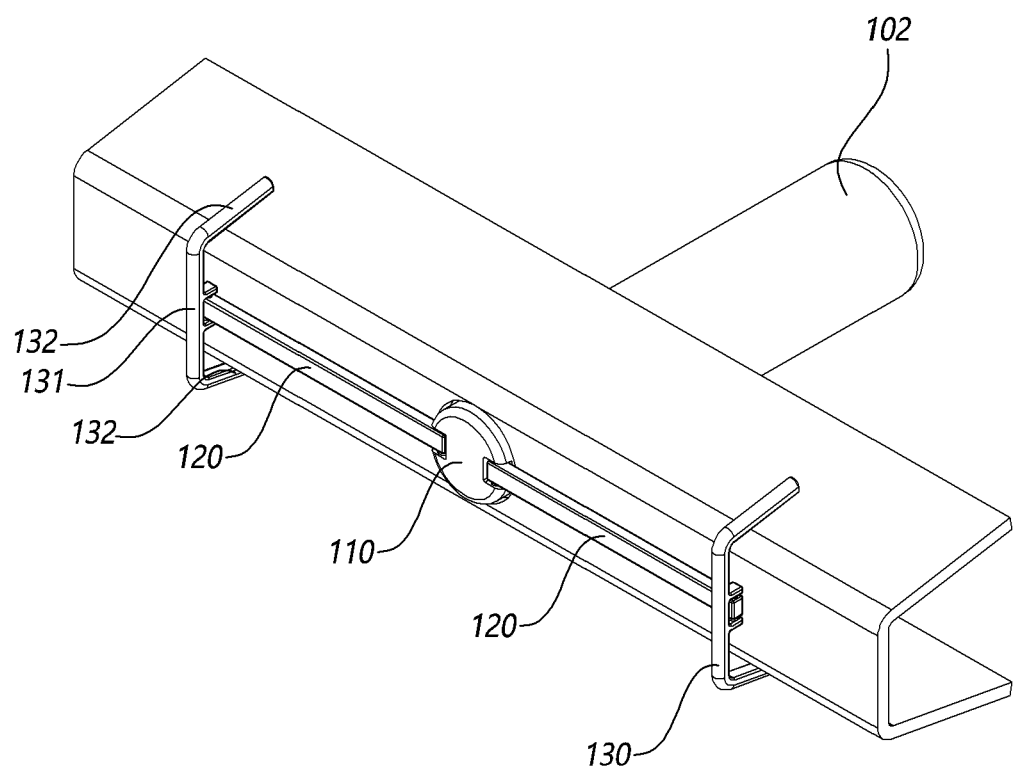
FIG. 3 is a perspective view illustrating a steering device of a vehicle according to the present embodiments.
Figure 4:
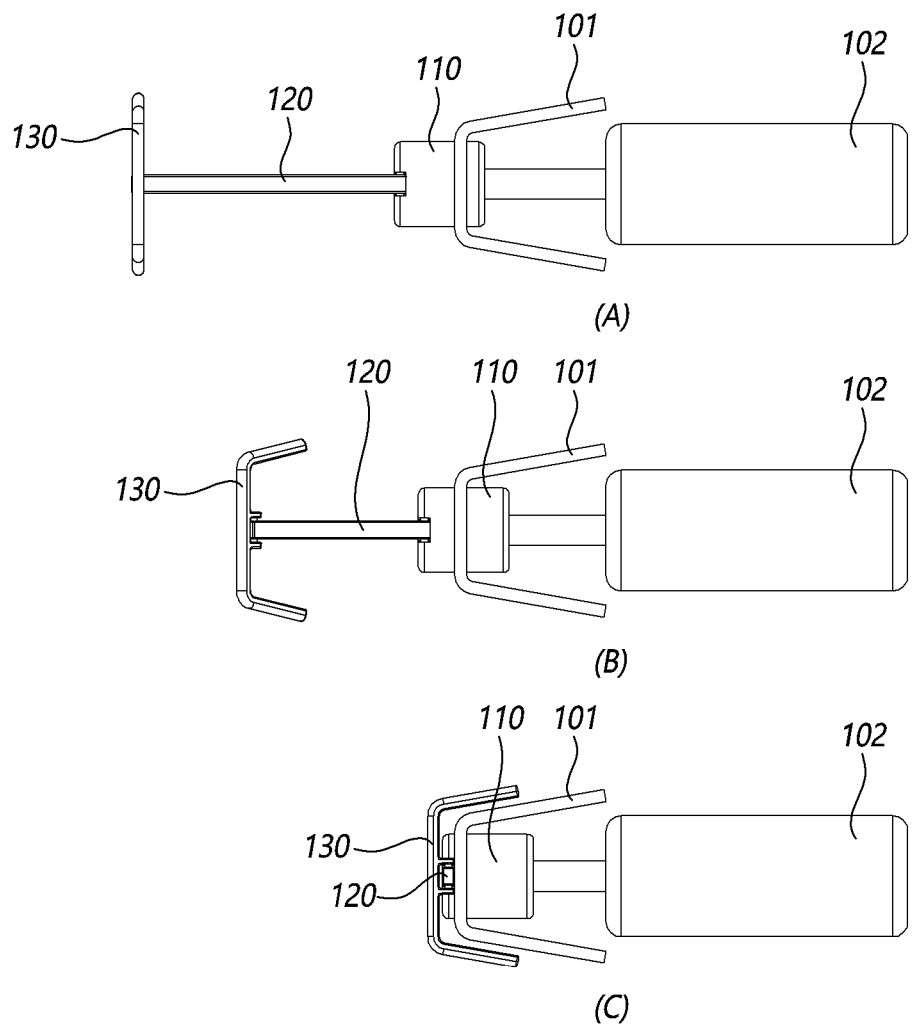
FIG. 4 is a side view illustrating a steering device of a vehicle according to the present embodiments.

FIG. 1 is a perspective view illustrating a steering device of a vehicle according to the present embodiments. FIG. 2 is a perspective view illustrating a steering device of a vehicle according to the present embodiments. FIG. 3 is a perspective view illustrating a steering device of a vehicle according to the present embodiments. FIG. 4 is a side view illustrating a steering device of a vehicle according to the present embodiments. FIG. 5 is an exploded perspective view illustrating a portion of a steering device of a vehicle according to the present embodiments. FIG. 6 is a perspective view illustrating a portion of a steering device of a vehicle according to the present embodiments.

A steering device 100 of a vehicle according to the present embodiments includes a base part 110 coupled to a vehicle body 101, a pair of spoke parts 120 each having one end coupled to be rotatable with respect to the base part 110 to operate in an operating state where another end thereof is positioned adjacent or in an expanded state where the other end is spaced apart, and a pair of rim parts 130 respectively coupled to the other ends of the spoke parts 120.

Referring to FIGS. 1 to 3, the steering device 100 according to the present embodiments includes a base part 110, a spoke part 120, and a rim part 130. The spoke part 120 is rotated with respect to the base part 110 and operates in an operating state (see FIG. 1) or an expanded state (see FIG. 3). In the operating state, the rim part 130 forms a steering wheel to be gripped by a driver to input a steering input. The expanded state is, e.g., a state for securing a space of the driver's seat in the autonomous driving mode, in which the rim part 130 is in tight contact with the vehicle body 101.

The base part 110 is coupled to the vehicle body 101. The structure and shape of the vehicle body 101 are not particularly limited, but may be, e.g., a dashboard as shown in the drawings. The base part 110 may be moved axially with respect to the vehicle body 101 as is described below in detail. The base part 110 may be coupled to the steering column 102 and may be moved in the axial direction by a driver provided in the steering column 102.

A pair of spoke parts 120 are provided, and one end of each spoke part 120 is rotatably coupled to the base part 110. According to an embodiment, rotary shafts of the pair of spoke parts 120 with respect to the base part 110 may be parallel. In other words, the pair of spoke parts 120 as shown in the drawings may have a rotary shaft in the z-axis direction.

Both the spoke parts 120 may be rotated in opposite directions with respect to respective rotary shafts, may be rotated such that the other ends are adjacent to each other to be positioned in the operating state, or may be rotated such that the other ends are spaced apart from each other to be positioned in the expanded state. FIG. 1 illustrates a state in which both spoke parts 120 are positioned in the operating state, and FIG. 3 illustrates a state in which both spoke parts 120 are positioned in the expanded state. FIG. 2 illustrates an intermediate process in which both spoke parts 120 are positioned from the operating state to the expanded state, or from the expanded state to the operational state. In other words, the two spoke parts 120 may be rotated clockwise and counterclockwise, respectively, in view of the drawings, to be positioned from the operating state to the expanded state, or may be rotated counterclockwise and clockwise, respectively, to be positioned from the expanded state to the operating state.

According to an embodiment, the base part 110 may be coupled to the vehicle body 101 so as to be movable in the axial direction. The base part 110 is connected to the steering column 102 and coupled to the vehicle body 101, and the base part 110 may be moved in the axial direction by a driver provided in the steering column 102. The axial movement of the base part 110 may implement a telescoping motion for the driver to adjust the position of the steering wheel. In other words, if the base part 110 is moved in the axial direction while the spoke part 120 is positioned in the operating state, the steering wheel formed by the rim part 130 is moved in the axial direction. The driver may adjust the axial position of the steering wheel while the spoke part 120 is positioned in the operating state. Meanwhile, in the telescoping motion, when the base part 110 is moved in the axial direction, the spoke part 120 is not rotated. However, when the spoke part 120 is positioned from the operating state to the expanded state or when the spoke part 120 is positioned from the expanded state to the operating state, the base part 110 may be moved in the axial direction along with the position movement of the scope portion 120.

Referring to FIG. 4, according to an embodiment, the rotation of the spoke part 120 with respect to the base part 110 may be performed in association with the axial movement of the base part 110 with respect to the vehicle body 101. In other words, when the spoke part 120 is rotated with respect to one end coupled to the base part 110, the base part 110 may be moved in the axial direction together.

When the telescoping motion is performed, the spoke part 120 is fixed to the operating state without being rotated with respect to the base part 110. In other words, in the state illustrated in FIG. 4(A), with the spoke part 120 fixed, only the base part 110 may be moved in the axial direction with respect to the vehicle body 101, and the telescoping motion may be performed.

In contrast, when the spoke part 120 is positioned from the operating state to the expanded state, the base part 110 may be moved in a direction in which the base part 110 is inserted into the vehicle body 101 to secure a wider space of the driver's seat. In other words, the spoke part 120 and the base part 110 may move in the order of (A), (B), and (C) of FIG. 4. The position of the base part 110 in the expanded state of the spoke part 120 may be a state of being inserted into the vehicle body 101 rather than the position of the base part 110 in the maximum telescope-in state. Further, when the spoke part 120 is positioned from the expanded state to the operating state again, the base part 110 may be moved in a direction in which the base part 110 is withdrawn from the vehicle body 101. In this case, the spoke part 120 and the base part 110 may move in the order of (C), (B), and (A) of FIG. 4.

Referring to FIGS. 1 to 4, according to an embodiment, the rim part 130 may be rotatably coupled to the other end of the spoke part 120. The rim part 130 forms a steering wheel that may be gripped by the driver when the spoke part 120 is positioned in the operating state. Further, when the spoke part 120 is positioned in the expanded state, it is preferable to be in tight contact with the vehicle body 101 to maximize the space of the driver's seat. As the rim part 130 is rotatably coupled to the other end of the spoke part 120, the rim part 130 may form a steering wheel when the spoke part 120 is in the operating state, but may be in tight contact with the vehicle body 101 when the spoke part 120 is in the expanded state. The rim part 130 may include a coupling part 131 rotatably coupled to the other end of the spoke part 120, and bends 132 at two opposite ends of the coupling part 131. One rim part 130 may include a coupling part 131 and a pair of bends 132, and the pair of rim parts 130 may be rotated such that the coupling part 131 and the bend 132 form a steering wheel in the operating state of the spoke part 120 (see FIG. 1). The pair of rim parts 130 may be rotated such that the bend 132 is in tight contact with the surface of the vehicle body 101 in the expanded state of the spoke part 120 (see FIG. 3).

According to an embodiment, the rotary shaft of the rim part 130 with respect to the spoke part 120 may be parallel to the rotary shaft of the spoke part 120 with respect to the base part 110. In other words, the rotary shaft with respect to the base part 110 and the rotary shaft with respect to the rim part 130 provided at two opposite ends of the spoke part 120 may be parallel. Since both rotary shafts are provided in parallel, it becomes easy for the rim part 130 to form a steering wheel or to be in tight contact with the vehicle body 101 in the operating state and the expanded state of the spoke part 120 according to the rotation of the spoke part 120 and the rotation of the rim part 130.

According to an embodiment, the rotation of the spoke part 120 with respect to the base part 110 and the rotation of the rim part 130 with respect to the spoke part 120 may be performed in association with each other. In other words, while the spoke part 120 is rotated with respect to the base part 110 to be positioned in the operating state or the expanded state, the rim part 130 may be rotated to form a steering wheel or to be in tight contact with the vehicle body 101. More specifically, when the spoke part 120 is rotated from the operating state to the expanded state, the rim part 130 may be rotated from the position forming the steering wheel to the position in tight contact with the vehicle body 101. When the spoke part 120 is rotated from the expanded state to the operating state, the rim part 130 may be rotated from the position in tight contact with the vehicle body 101 to the position forming the steering wheel. The position of the rim part 130 forming the steering wheel and the position of the rim part 130 being in tight contact with the vehicle body 101 are relative positions with respect to the other end of the spoke part 120, and are relative positions with respect to the other end of the spoke part 120 in the states illustrated in FIGS. 1 and 3, respectively.

According to an embodiment, the rotary shaft of the rim part 130 with respect to the spoke part 120 may be parallel to the rotary shaft of the spoke part 120 with respect to the base part 110, the rotation of the spoke part 120 with respect to the base part 110 and the rotation of the rim part 130 with respect to the spoke part 120 may be performed in association with each other, and the direction of the rotation of the spoke part 120 with respect to the base part 110 and the direction of the rotation of the rim part 130 with respect to the spoke part 120 may be opposite to each other. In other words, the spoke part 120 and the rim part 130 having rotary shafts parallel to each other may be rotated in association with each other, but in opposite directions. That the spoke part 120 and the rim part 130 are rotated in opposite directions means that the rim part 130 rotatably coupled to each spoke part 120 is rotated in opposite directions to the rotation of the spoke part 120 coupled therewith. In other words, because the two spoke parts 120 are rotated in opposite directions when rotated in the operating state or the expanded state, the two rim parts 130 are also rotated in opposite directions. Accordingly, as illustrated in FIGS. 1 to 3, when both spoke parts 120 are rotated from the operating state to the expanded state, both rim parts 130 may be in tight contact with the vehicle body 101, and when both spoke parts 120 are rotated from the expanded state to the operating state, both rim parts 130 may form a steering wheel.

According to an embodiment, the base part 110 may be coupled to the vehicle body 101 to be movable in the axial direction, the rim part 130 may be coupled to the other end of the spoke part 120 to be rotatable, and the rotation of the spoke part 120 with respect to the base part 110 and the rotation of the rim part 130 with respect to the spoke part 120 may be performed in association with the axial movement of the base part 110 with respect to the vehicle body 101. In other words, the base part 110 may be moved in the axial direction while the spoke part 120 is rotated in the operating state or the expanded state and the rim part 130 is rotated to the position forming the steering wheel or the position in tight contact with the vehicle body 101.

When the telescoping motion is performed, the spoke part 120 is fixed to the operating state without being rotated with respect to the base part 110, and the rim part 130 is fixed to the position where the steering wheel is formed without being rotated with respect to the spoke part 120. In other words, in the state illustrated in FIG. 4(A), with the spoke part 120 and the rim part 130 fixed, only the base part 110 may be moved in the axial direction with respect to the vehicle body 101, and the telescoping motion may be performed.

In contrast, when the spoke part 120 is rotated to the operating state or the unfolding state and the rim part 130 is rotated to the position forming the steering wheel or the position in tight contact with the vehicle body, the base part 110 may be moved in the direction of being withdrawn from the vehicle body 101 or the direction of being inserted into the vehicle body 101.

A steering device 100 of a vehicle according to the present embodiments includes a base part 110 coupled to a vehicle body 101, at least one spoke part 120 having one end coupled to be rotatable with respect to the base part 110 via a first rotary shaft 511 and rotated by a first driver 521, and at least one rim part 130 coupled to another end of each spoke part 120. It is preferable that one rim part 130 is coupled to each spoke part 120, but the present embodiments are not limited. As illustrated in the drawings, embodiments in which the pair of spoke parts 120 are rotatably coupled to the base part 110, and the pair of rim parts 130 are rotatably coupled to the other end of each spoke part 120 are described. The same features as those of the above-described embodiments will be briefly described, and the description focuses primarily on differences.

Referring to FIGS. 5 to 6, one end of the spoke part 120 and the base part 110 are coupled through the first rotary shaft 511. The first rotary shaft 511 may be fixed to one end of the spoke part 120 and hinged to the base part 110, or may be hinged to one end of the spoke part 120 and fixed to the base part 110. The first driver 521 provides torque about the first rotary shaft 511 to the spoke part 120 to rotate the spoke part 120 to the operating state or the expanded state. When a plurality of spoke parts 120 are provided, the first driver 521 may be provided to simultaneously provide torque to each spoke part 120, or may be provided to independently provide torque to each spoke part 120.

According to an embodiment, the first driver 521 may rotate the spoke part 120 with respect to the base part 110 by providing torque to the first rotary shaft 511. A gear may be coupled to the first rotary shaft 511, and the first driver 521 may rotate the spoke part 120 by providing torque to the gear of the first rotary shaft 511. According to an embodiment, the first driver 521 may include a first motor provided to provide torque to the first rotary shaft 511.

According to an embodiment, the first motor may be embedded in the spoke part 120 (see reference numeral 611). In other words, the first rotary shaft 511 may be fixed to the base part 110 and hinged to the spoke part 120, and the first motor may rotate the spoke part 120 by providing torque to the first rotary shaft 511 while being embedded in the spoke part 120. For example, the first motor may provide torque to the first rotary shaft 511 through a bevel gear part. A plurality of first motors may be provided in spoke parts 120, respectively, to independently rotate each spoke part 120 with respect to the base part 110.

According to an embodiment, the first motor may be embedded in the base part 110. In other words, the first rotary shaft 511 may be hinged to the base part 110 and fixed to the spoke part 120, and the first motor may rotate the spoke part 120 by providing torque to the first rotary shaft 511 while being embedded in the base part 110. For example, the first motor may provide torque to the first rotary shaft 511 through a worm shaft-worm wheel gear part or a pinion-rack gear part. One first motor may simultaneously rotate the spoke parts 120 through a gear structure.

According to an embodiment, the base part 110 may be coupled to the vehicle body 101 to be movable in the axial direction, and may be moved in the axial direction by the second driver 522. The second driver 522 may be provided in the steering column 102 to move the base part 110 in the axial direction. For example, the second driver 522 may include a nut coupled to the base part 110, a screw engaged with the nut, and a motor for rotating the screw, and the nut may be moved on the screw and the base 110 may be moved in the axial direction by driving the motor.

According to an embodiment, the steering device 100 of the vehicle according to the present embodiments may include a controller for controlling the first driver 521 and the second driver 522, and the controller may drive the first driver 521 together with the second driver 522, or may drive the second driver 522 without driving the first driver 521. In other words, the controller may drive only the second driver 522, or may drive the first driver 521 and the second driver 522 together. The controller may perform a telescoping motion by driving only the second driver 522 to adjust the axial position of the base part 110. Alternatively, the controller may drive the first driver 521 and the second driver 522 together to rotate the spoke part 120 to the operating state or the expanded state while simultaneously moving the base part 110 in the axial direction.

According to an embodiment, the rim part 130 may be rotatably coupled to the other end of the spoke part 120 through the second rotary shaft 512. The second rotary shaft 512 may be fixed to the rim part 130 and hinged to the spoke part 120, or hinged to the rim part 130 and fixed to the spoke part 120.

According to an embodiment, the first driver 521 may rotate the spoke part 120 with respect to the base part 110 and rotate the rim part 130 with respect to the spoke part 120 by providing torque to the first rotary shaft 511 and the second rotary shaft 512 together. As the spoke part 120 is rotated to the operating state by the first driver 521, the rim part 130 may be rotated to the position forming the steering wheel, or as the spoke part 120 is rotated to the expanded state, the rim part 130 may be rotated to the position in tight contact with the vehicle body 101.

According to an embodiment, the first rotary shaft 511 and the second rotary shaft 512 may be connected by a belt or a wire so that the torque provided to the first rotary shaft 511 is transmitted to the second rotary shaft 512 as well. The first driver 521 may include a first motor capable of providing torque to the first rotary shaft 511, and the spoke part 120 may be rotated by the torque provided by the first motor to the first rotary shaft 511. The torque of the first motor may be transmitted to the second rotary shaft 512 through the belt or the wire, and the rim part 130 may be rotated. The first motor may be embedded in the base part 110 or may be embedded in the spoke part 120.

According to an embodiment, the first driver 521 may include a first motor provided to provide torque to the first rotary shaft 511 and the second rotary shaft 512. The first motor may be embedded in the spoke part 120 and may be connected to the first rotary shaft 511 and the second rotary shaft 512 provided at two opposite ends of the spoke part 120 by, e.g., a bevel gear part to provide torque, respectively.

According to an embodiment, the rim part 130 may be rotated by the third driving part 523. The third driver 523 may be provided to rotate the rim unit 130 with respect to the other end of the spoke part 120. By the third driver 523, the rim part 130 may be rotated to the position where the steering wheel is formed when the spoke part 120 is in the operating state, or may be rotated to the position where the rim part 130 is in tight contact with the vehicle body 101 when the spoke part 120 is in the expanded state. The third driver 523 may be provided in each rim part 130 or each spoke part 120 to rotate the corresponding rim part 130 with respect to the spoke part 120.

According to an embodiment, the third driver 523 may rotate the rim part 130 with respect to the spoke part 120 by providing torque to the second rotary shaft 512. A gear may be coupled to the second rotary shaft 512, and the third driver 523 may rotate the rim part 130 by providing torque to the gear of the second rotary shaft 512. According to an embodiment, the third driver 523 may include a second motor provided to provide torque to the second rotary shaft 512.

According to an embodiment, the second motor may be embedded in the spoke part 120 (see reference numeral 612). In other words, the second rotary shaft 512 may be fixed to the rim part 130 and hinged to the spoke part 120, so that the second motor may rotate the rim part 130 by providing torque to the second rotary shaft 512 while being embedded in the spoke part 120. For example, the second motor may provide torque to the second rotary shaft 512 through a bevel gear part. A plurality of second motors may be provided in each spoke part 120 to independently rotate each rim part 130 with respect to the spoke part 120.

According to an embodiment, the steering device 100 of the vehicle according to the present embodiments may include a controller for controlling the first driver 521, the second driver 522, and the third driver 523, and the controller may drive the first driver 521 and the third driver 523 together with the second driver 522, or may drive the second driver 522 without driving the first driver 521 and the third driver 523.

The controller may perform a telescoping motion by driving only the second driver 522 to adjust the axial position of the base part 110. Alternatively, the controller may drive the first driver 521 and the third driver 523 together with the second driver 522 to rotate the spoke part 120 to the operating state or the expanded state, and may rotate the rim unit 130 to the position of forming the steering wheel or to the position in tight contact with the vehicle body 101, while simultaneously moving the base part 110 in the axial direction.

By the vehicle steering device having the above-described structure, it is possible to separate the steering wheel from the driver's seat with a simple structure, thereby enhancing structural stability and rigidity, reducing the number of parts for changing the steering wheel structure, and minimizing the volume and mass of the steering device.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering device of a vehicle, comprising:
a base part coupled to a vehicle body;
a pair of spoke parts each having one end coupled to be rotatable with respect to the base part to operate in an operating state where another end thereof is positioned adjacent or in an expanded state where the other end is spaced apart; and
a pair of rim parts respectively coupled to the other ends of the spoke parts,
wherein the rim part is rotatably coupled to the other end of the spoke part.

2. The steering device of claim 1, wherein the pair of spoke parts may have a rotary shaft parallel to the base part.

3. The steering device of claim 1, wherein the base part is movably coupled to the vehicle body in an axial direction.

4. The steering device of claim 3, wherein the rotation of the spoke part with respect to the base part is performed in association with axial movement of the base part with respect to the vehicle body.

5. The steering device of claim 1, wherein a rotary shaft of the rim part with respect to the spoke part is parallel to a rotary shaft of the spoke part with respect to the base part.

6. The steering device of claim 1, wherein the rotation of the spoke part with respect to the base part and the rotation of the rim part with respect to the spoke part are performed in association with each other.

7. The steering device of claim 1, wherein a rotary shaft of the rim part with respect to the spoke part is parallel to a rotary shaft of the spoke part with respect to the base part, and the rotation of the spoke part with respect to the base part is performed in association with the rotation of the rim part with respect to the spoke part, and
wherein a direction of the rotation of the spoke part with respect to the base part and a direction of the rotation of the rim part with respect to the spoke part are opposite to each other.

8. The steering device of claim 1, wherein the base part is rotatably coupled to the vehicle body in an axial direction, and the rim part is rotatably coupled to the other end of the spoke part, and
wherein the rotation of the spoke part with respect to the base part and the rotation of the rim part with respect to the spoke part are performed in association with axial movement of the base part with respect to the vehicle body.

9. A steering device of a vehicle, comprising:
a base part coupled to a vehicle body;
at least one spoke part having one end coupled to be rotatable with respect to the base part via a first rotary shaft and rotated by a first driver; and
at least one rim part coupled to another end of each spoke part,
wherein the rim part is rotatably coupled to the other end of the spoke part via a second rotary shaft.

10. The steering device of claim 9, wherein the first driver rotates the spoke part with respect to the base part by providing torque to the first rotary shaft.

11. The steering device of claim 10, wherein the first driver includes a first motor provided to provide torque to the first rotary shaft.

12. The steering device of claim 10, wherein the base part is coupled to the vehicle body to be movable in an axial direction, and is moved in the axial direction by a second driver.

13. The steering device of claim 12, further comprising a controller for controlling the first driver and the second driver,
wherein the controller drives the first driver together with the second driver, or drives the second driver without driving the first driver.

14. The steering device of claim 9, wherein the first driver rotates the spoke part with respect to the base part and rotates the rim part with respect to the spoke part by providing torque to both the first rotary shaft and the second rotary shaft.

15. The steering device of claim 9, wherein the rim part is rotated by a third driver.

16. The steering device of claim 15, wherein the third driver rotates the rim part with respect to the spoke part by providing torque to the second rotary shaft.

17. The steering device of claim 16, wherein the third driver includes a second motor provided to provide torque to the second rotary shaft.

18. The steering device of claim 15, further comprising a controller for controlling the first driver, the second driver, and the third driver,
   wherein the controller drives the first driver and the third driver together with the second driver, or drives the second driver without driving the first driver and the third driver.

\* \* \* \* \*